US005838331A

United States Patent [19]
DeBry

[11] Patent Number: 5,838,331
[45] Date of Patent: Nov. 17, 1998

[54] COMPUTER GRAPHICS SYSTEM FOR CREATING AND ENHANCING TEXTURE MAPS

[75] Inventor: David Franklyn DeBry, Salt Lake City, Utah

[73] Assignee: Parametric Technology Corporation, Waltham, Mass.

[21] Appl. No.: 912,769

[22] Filed: Aug. 18, 1997

Related U.S. Application Data

[63] Continuation of Ser. No. 398,168, Mar. 2, 1995, abandoned.
[51] Int. Cl.⁶ .................................................. G06T 7/40
[52] U.S. Cl. ........................................... 345/430; 345/425
[58] Field of Search .................................. 345/418–420, 345/425, 430

[56] References Cited

U.S. PATENT DOCUMENTS

| | | | |
|---|---|---|---|
| 4,602,286 | 7/1986 | Kellar et al. | 348/597 |
| 4,633,416 | 12/1986 | Walker | 345/431 |
| 4,646,251 | 2/1987 | Hayes et al. | 345/423 |
| 4,855,934 | 8/1989 | Robinson | 345/430 |
| 5,038,223 | 8/1991 | Yamada | 358/445 |
| 5,155,813 | 10/1992 | Donoghue et al. | 345/179 |
| 5,179,638 | 1/1993 | Dawson et al. | 345/425 |
| 5,192,208 | 3/1993 | Ferguson et al. | 434/2 |
| 5,230,039 | 7/1993 | Grossman et al. | 345/430 |
| 5,233,684 | 8/1993 | Ulichney | 345/431 |
| 5,237,647 | 8/1993 | Roberts et al. | 345/419 |
| 5,245,432 | 9/1993 | Jaffray et al. | 348/578 |
| 5,251,160 | 10/1993 | Rockwood et al. | 364/578 |
| 5,255,352 | 10/1993 | Falk | 345/425 |
| 5,307,452 | 4/1994 | Hahn et al. | 345/432 |
| 5,315,709 | 5/1994 | Alston, Jr. et al. | 707/6 |
| 5,325,473 | 6/1994 | Monroe et al. | 345/429 |
| 5,343,220 | 8/1994 | Veasy et al. | 345/199 |
| 5,359,526 | 10/1994 | Whittington et al. | 701/200 |
| 5,436,733 | 7/1995 | Terada et al. | 358/448 |
| 5,469,535 | 11/1995 | Jarvis et al. | 345/430 |
| 5,469,536 | 11/1995 | Blank | 345/431 |
| 5,471,572 | 11/1995 | Buchner et al. | 345/439 |
| 5,490,240 | 2/1996 | Foran et al. | 345/430 |
| 5,504,845 | 4/1996 | Vecchione | 345/419 |
| 5,566,283 | 10/1996 | Modegi et al. | 345/430 X |
| 5,566,284 | 10/1996 | Wakayama | 345/430 |

FOREIGN PATENT DOCUMENTS

| | | |
|---|---|---|
| 0 637 814 A2 | 2/1995 | European Pat. Off. . |
| 2140257 | 11/1984 | United Kingdom . |
| 2157122 | 10/1985 | United Kingdom . |
| WO 95/22122 | 8/1995 | WIPO . |

OTHER PUBLICATIONS

P. Ganrahan et al., "Direct WYSIWYG Painting and Texturing on 3D Shapes", *Computer Graphics*, vol. 24, pp. 215–223 (Aug. 1990).

H.K. Pedersen, "Decorating Implicit Surfaces", *Computer Graphics Proceedings, Annual Conference Series*, pp. 291–300 (Aug. 1995).

H. Sakurai et al., "Solid Model Input Through Orthographic Views", *Computer Graphics*, vol. 17, pp. 243–247 (Jul. 1983).

(List continued on next page.)

*Primary Examiner*—Anton Fetting
*Attorney, Agent, or Firm*—Lahive & Cockfield, LLP

[57] ABSTRACT

Supplemental data, as textured data, for use with geometric data to produce a display image is expanded by relating between display space and model space. A texture map storing supplemental data is enhanced by first applying new texture data as color, to an image in two dimensional display space. The locations for the data in the dimensional model space are determined and transformed into texture map space to receive the applied new texture data. Texture data is placed in the texture map by scan conversion of texels and blending.

11 Claims, 4 Drawing Sheets

OTHER PUBLICATIONS

S.M. Couter et al., "Automated Conversion of Curvilinear Wire–Frame Models to Surface Boundary Models; A Topological Approach", SIGGRAPH, vol. 20, pp. 171–178 (Aug. 1986).

J.D. Foley et al., "Computer Graphics Principles and Practice", 2nd Edition, Chapter 11 (1990).

K. Inoue, "System–G Enables Real–Time 3D Texture Mapping", *JEE J. Electronic Eng.,* Tokyo Japan, vol. 27, pp. 64–67 (1990).

P. Haeberli, "Paint By Numbers: Abstract Image Representations", *Computer Graphics,* vol. 24, pp. 207–214 (Aug. 1990).

P. Haeberli et al., "Texture Mapping as a Fundamental Drawing Primitive", 8 pages (Fourth Eurographics Workshop on Rendering, Paris, France—Jun. 1993).

M. Drabick, "Commodore Amiga Blessed with Mature, Yet Low Cost 2–D, 3–D Software", Computer Pictures VII, Issue No. 2, p. 38(2) (Mar.–Apr. 1993).

"Ray Dream Designer 3.0 Slated To Ship In Sep. Aug. 20, 1993", Newsbytes News Network, p. N/A (Aug. 1993).

M.E. Clemens et al., Graphics Innovation Apple's EWorld Highlight Lively Macworld Expo., Seybold Report on Desktop Publishing, vol. 8, p. 38(12) (Feb. 1994).

Choe et al.., Shape from Textured and Shaded Surface, Proc. 10th Int Conf. Pattern Recognition, May 1990, pp. 294–296.

Demirer et al., Texture Mapping using Clustering Techniques, Mediterranean Electrotechnical Conference, Apr. 1994, pp. 355–358.

Bennis et al., Piecewise Surface Flattening for Non–Distorted Texture Mapping, Computer Graphics, Jul. 1991, pp. 237–246.

Segal et al., Fast Shadows and Lighting Special Effects Using Texture Mapping, Computer Graphics, Jul. 1992, pp. 249–252.

Van Wijk, Spot Noise, Computer Graphics, Jul. 1991, pp. 309–318.

Blinn, The Truth About Texture Mapping, IEEE Computer Graphics and Applications, Mar. 1990, pp. 78–83.

Dudgeon, Algorithms for Graphics Texture Mapping, System Theory, Mar. 1991, pp. 613–617.

Spiller, 3–D Texture Mapping, Dr. Dobbs Journal Jul. 1994, pp. 32–38.

Pearson, D., "Texture Mapping in Model–Based Image Coding", *Signal Processing Image Communication* 2, No. 4(Dec. 1990) pp. 377–395.

Craske et al., Texture Descriptors for Multi–Resolution Image Segmentation, IEEE Colloq. No. 178:Texture Classification:Theory and Applications, pp. 4/1–4/3, Oct. 1994.

Blondel et al., Textural Analysis and Structure–Tracking for Geological Mapping, Oceans '93, p. III–209 to III–213, Feb. 1993.

Dudgeon et al., Algorithms for Graphics Texture Mapping, Proc. 23rd Southeastern Symposium on System Theory, pp. 613–617, Mar. 1991.

COMPUTER GRAPHICS SYSTEM FOR CREATING AND ENHANCING TEXTURE MAPS

This application is a continuation of application Ser. No. 08/398,168 filed on Mar. 2,1995 Entitled: Computer Graphics System for Creating and Enhancing Texture Maps, abandoned.

BACKGROUND AND SUMMARY OF THE INVENTION

Generally, computer graphics systems involve the display of data on the screen of a cathode ray tube (CRT) to accomplish dynamic images. Typically, the displays consist of a rectangular array including thousands of individual picture elements (pixels or pels). Each pixel in the array manifests processed pixel data, for example data representing color, intensity and depth.

Pixel data may be supplied to the CRT from a so called "frame buffer" capable of receiving and delivering the data at a high rate. Various formats for organizing and scanning frame buffers to drive displays, pixel-by-pixel, are disclosed in a textbook entitled "Computer Graphics: Principles And Practice", Second Edition, Foley, Van Dam, Feiner & Hughes, Published 1987, by Addison-Wesley Publishing Company (incorporated herein by reference).

To sequentially "display" or "write" pixels by exciting the CRT display screen, raster-scan patterns are widely used, both in television, and in the field of computer graphics. Raster scan operation can be analogized to the pattern of western reading, i.e. pixels, like words are scanned one by one, from left to right, row by row, moving downward. Thus, the exciting beam of the CRT traces a raster pattern to accomplish a dynamic display pixel-by-pixel, line-by-line, frame-by-frame. Systems for such displays are described in detail in the above-referenced Foley textbook.

Generally, to support a dynamic graphics display, three dimensional geometric data, representative of objects or primitives (e.g. polygons, as triangles) is stored in a main memory, as in the form of a disk. The geometric data (three dimensional or 3D) is processed to provide selected data that is converted to two dimensional (2D) display data defining each individual pixel. Thus, graphics images are formed from primitive shapes (typically triangles) defining objects that are displayed.

To generate the pixels for a display, the selected primitives are treated with respect to a particular viewpoint and are dissected by a process called "scan conversion" to determine their contributions to each pixel. As the primitives are processed, the dominance between over lapping objects is resolved. For example, a dominant object may hide the surfaces of an obscured object. Consequently, the primitives are considered individually in relation to the cumulative determination for each pixel (stored in the frame buffer) until all objects are considered. Concurrent with the processing of primitives, textures may be reflected in the pixels, as from a texture memory, e.g. a memory containing a texture map.

Considering the graphics operation in somewhat greater detail, typically, primitives are stored in three dimensional "model" or "world" space defined by a coordinate system. World space along with geometrical transformations are treated in the above-referenced Foley textbook in Chapter 5. One such transformation involves normalizing so that a view volume is transformed into a canonical view volume. Transformed primitives are clipped against the canonical view volume then further transformed into two dimensional screen space for display. Generally, these initial operations are performed in a geometry subsystem sometimes referred to as the "front end" of a graphics display system. That is, the front end subsystem traverses the display model and transforms primitives into screen space. Structures and operations of such subsystems are discussed in the above-referenced Foley textbook in Chapter 18.

Proceeding with the data from the front end, a so called "back-end" subsystem creates the final image by scan converting each of the primitives, determining which primitives are visible at each pixel and shading the selected pixels accordingly. Such operations are discussed in the above-referenced Foley textbook in Chapter 18.

As objects are formed of polygons, to accomplish finer detail in computer graphics images, objects may be divided into greater numbers of polygons, e.g. triangles. However, the practical limitations of such divisions prompted the development of an alternative approach known as "texture mapping." Essentially, a texture map, comprised of individual elements called "texels," is provided in two dimensional space, commonly defined in rectangular coordinates designated "u" and "v". Basically, by mapping the texture onto a primitive, it is textured, as with a pattern of bricks, or even a picture. A detailed treatment of texture maps and mapping appears in the above-referenced Foley textbook in Chapter 16.

Although texture mapping techniques have come into widespread use, the creation of texture maps related to three dimensional (3-D) objects has presented several problems. Note, as indicated above, that the object or model for an image exists in world space and is three dimensional while the texture map for application to the model exists in two dimensional texture space. Consider some techniques employed in the past to accomplish the texture for a desired display.

In accordance with one prior method, typically a 3-D model is created by one person and a 2-D picture of the object being modeled is created by another person. A third person is assigned the job of warping the 2-D image to fit the 3-D model, or vice versa. As the two, object and image, were created separately, the task typically is difficult and time consuming with poor results. The operation can be analogized to stretching a photograph of a person's face to fit correctly on the head of a mannequin.

As another approach, the 3-D model is created in the graphics and displayed. A 2-D texture map also is displayed. In an interactive operation, an operator makes modifications to the 2-D texture map then views the consequences with application to the model. The operation is somewhat analogous to peeling an orange, laying the peel flat, and attempting to paint a map of the earth on the peel so that it looks correct when applied back to the orange. The limitation is that paint can be applied to the peel only while it is flat. Again, the method is awkward and time consuming.

Considering still another approach, a 3-D model is created and displayed. The orientation of the model with respect to a particular view is used to map from 3-D model space to 2-D texture space. Color, transparency and other data is applied directly to the selected view of the 3-D model. The data is then transformed through the mapping into the texture map. The problem with the method is that it is view dependant. That is, as soon as the model is scaled, rotated, translated or otherwise moved, the data in the texture map is useless. The mapping from the 3-D model space to the 2-D texture space exists for only one orientation. Also, if a permanent mapping has been previously defined (a mapping that is orientation independent) the method will corrupt the previous mapping. The physical analogy would involve an orange that would lose its paint if moved. Specifically, if outlines of the continents were defined on the orange peel as preliminary texture, with movement, the outlines would be destroyed in the texture map.

Of course, other techniques have been suggested including hybrids of the methods described above. For example, it has been suggested to utilize a model of "micro-polygons" where each vertex of each micro-polygon stores texture data. As a consequence, the view-dependency problem is solved; however, the method impacts machine performance. Note that the data is not really stored as texture data, but rather as polygon vortex data. Consequently, detail of the model may not be increased by simply increasing the size of a texture map. The system also may have limitations in treating complex models.

Generally, the system of the present invention is intended to solve the problems of prior systems as mentioned above. Specifically, as disclosed in detail below, data can be placed directly on the model so that alignment can be correctly executed. Also as disclosed below, the applications of new data into a texture map will not destroy existing mappings between model space and texture space. Rather, the new or fresh data will be applied to the texture map conforming to existing mappings from model space to texture space. Furthermore, data sampling detail is not limited by geometric or polygonal detail of a model, but rather by the resolution of texture space which can be scaled independently of model detail.

In accordance with the disclosed embodiment, the system presumes geometric data for a 3-D model, for example, a cube, an animate head, or a world globe, along with specified mapping into 2-D texture space, e.g. in u,v coordinates. As disclosed, the system utilizes the geometric data to provide a display of the 3-D model. Supplemental data is then provided as to color the model. New supplemental data is then provided, as by using a "brush", adding "paint" directly on the displayed model. Note that new supplemental data in the form of texture data could be provided from a multitude of sources other than a brush, e.g. image editing or data manipulation systems. Also note that the supplemental data and the new supplemental data can represent any number of phenomena or informations other than texture. Specifically, the supplemental data may be texture or visual data (color, transparency, etc.), transformational or deformational systems for 3-D data (such as data for bump maps or displacement maps) or transformational or deformational systems for 2-D data (such as image processing kernels); also note the use of NURBs as discussed at page 502 of the referenced Foley textbook.

Pursuing the illustrative example of paint or color data on the model, it will be apparent that certain select pixels of the display are involved. Accordingly, the color data for each of those pixels is stored in a so called "hidden screen" space. With the color stored, the system picks the relevant polygons, e.g. front facing that are touched by the pixels. Utilizing transformations, the relevant polygons are ultimately located as texels in texture space. In the disclosed embodiment, the texels for blending into the texture map are scan converted. Specifically, as disclosed in detail below, the texels are related back through geometric data to specify pixels in screen space for the polygon in process. If a pixel is visible (based on the frame buffer content) the new data ("paint") is blended into the frame buffer content. Thereafter, the map may be effectively employed to texture, or otherwise treat primitives variously positioned and viewed in various perspectives.

BRIEF DESCRIPTION OF THE DRAWINGS

In the drawings, which constitute a part of this specification, exemplary embodiments of the invention are set forth as follows.

DESCRIPTION OF THE PREFERRED EMBODIMENT

As indicated above, a detailed illustrative embodiment of the present invention is disclosed herein. However, image displays, data processors, creative formats, forms of display or image data, storage and transformation techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
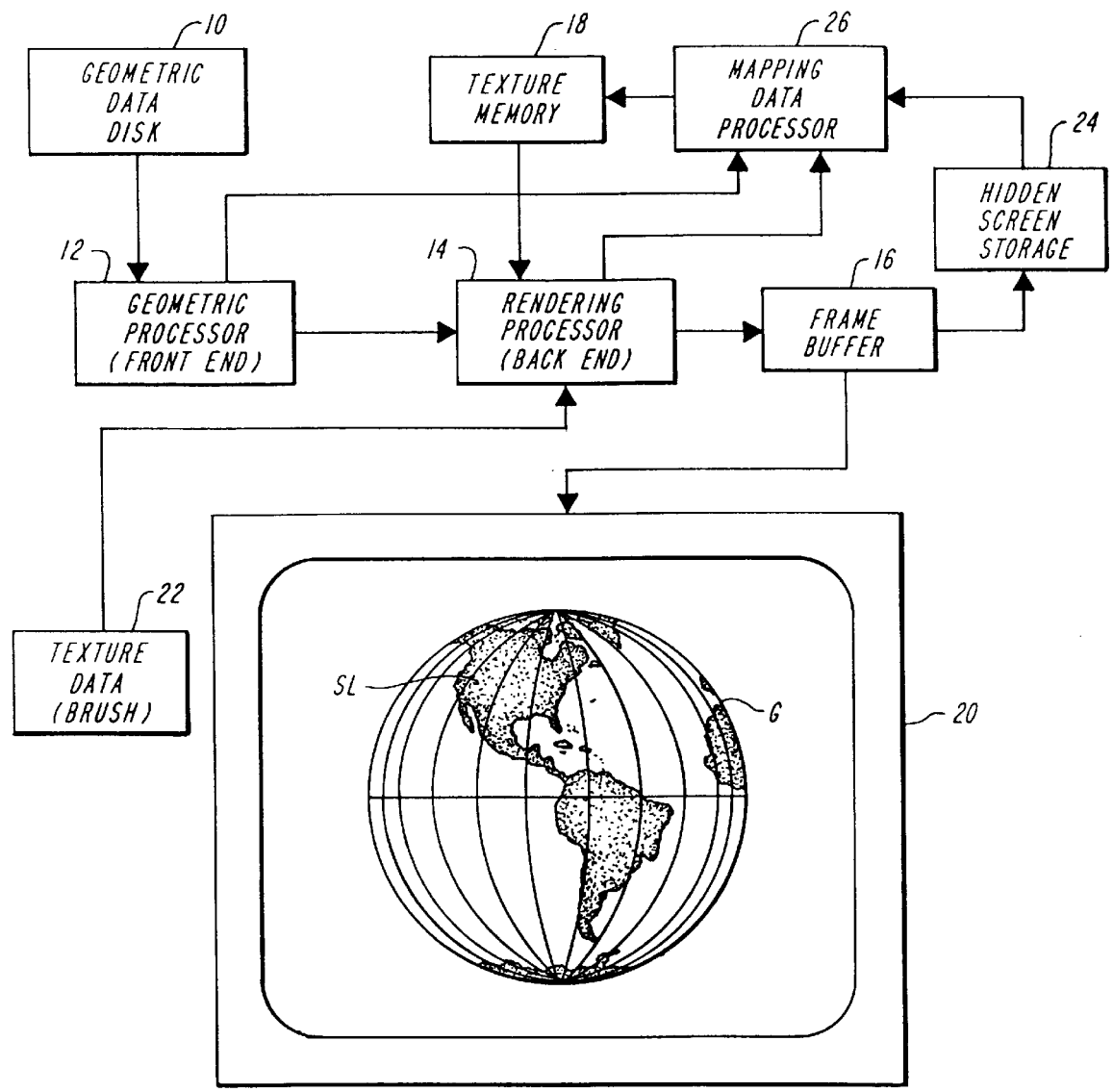
FIG. 1 is a block and pictorial diagram of a system constructed in accordance with the present invention.
Figure 2:
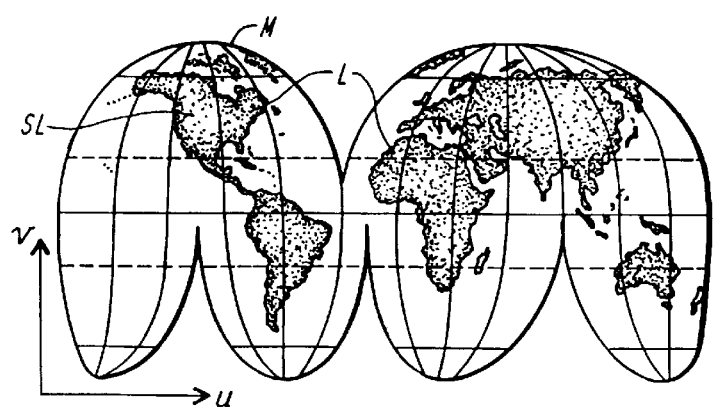
FIG. 2 is a diagrammatic representation of a texture map as developed in the system of FIG. 1.

Referring initially to FIG. 1, a world globe G is depicted in a graphics image display. As disclosed in detail below, the representation of the globe G involves 3-D geometric data defining a sphere and two dimensional texture data outlining land masses L. Also as described in detail below, the texture data may be stored in the form of a two dimensional texture map M somewhat as illustrated in FIG. 2.

To preliminarily consider the function of the disclosed embodiment, assume a desire to "paint" or color the globe G. To simplify the operation for purposes of explanation, assume an initial step of simply placing a new blue dot SL in a western region of the United States, e.g. designating Salt Lake City. Various techniques, including brush painting are well known for providing the dot SL on the globe G. In accordance herewith, after the dot SL is provided on the globe G, the data is processed and the dot SL is added to the texture map M, appropriately scaled to the geometric data of the globe G. Accordingly, the dot SL can be displayed on the globe G from various viewpoints and in various positions.

The data processing operation is substantial, as disclosed below, and typically, the operation would involve considerably more data than merely the dot SL. For example, it may be desirable to "paint" the globe G blue at ocean areas, variously color individual states in the land masses L and designate all major cities with dots. Such operations simply involve expansions of the simplified operation described below to accomplish the dot SL in the texture map M (FIG. 2).

The processing operations and structures for attaining the dot SL on the texture map M, from the dot SL on the world globe G are treated in detail below. However, preliminarily, consider the structure of the graphics system of FIG. 1. A geometric data disk 10 (FIG. 1, upper left) stores substantial 3D geometric data for displays. To indicate the data flow paths, the disk 10 is coupled to a geometric processor 12 which functions as a computer graphics front end. That is, the geometric processor 12 transforms selected primitives, e.g. triangles or nurbs, stored by the disk 10 into screen space to represent data for a display. Front end graphics processors for use herein are well known as treated in Chapter 18 of the above-referenced Foley textbook. Regarding the display of the world globe G, the geometric processor 12 handles the data defining the spherical globe G.

The data representing a sphere from the geometric processor 12 is provided to a rendering processor 14 which can be considered as the back end or rasterization processor for providing images in a frame buffer 16 by scan converting the primitives representing the sphere. The operation involves determining which primitives contribute to each pixel, then shading and texturing the pixel accordingly. With respect to texturing, the rendering processor 14 is coupled to a texture memory 18 containing texture maps, e.g. the map M of FIG. 2, less the dot SL (new data). As indicated above, suitable variations of the rendering processor 14 and the texture memory 18 are well known in the prior art as disclosed in the above-referenced Foley textbook.

The pixel data supplied from the rendering processor 14 to the frame buffer 16 establishes a representation of the image and accordingly drives a display unit 20 depicting the globe G. As suggested above, in accordance with programming or interface controls, the system is capable of variously moving the globe G, supplementing the display and altering the viewpoint of the globe G. Such techniques are well known; however, in accordance herewith, the present system is capable of texturing the globe G, as with the dot SL (new supplemental data), and attaining such texture in the texture memory 18 while preserving the outlines of land masses L (old or existing supplemental data) along with the dot SL. Preliminarily, a few comments regarding the processing to accomplish image displays by the unit 20 are now deemed appropriate.

As indicated above, individual pixels are developed in the frame buffer 16 by testing numerous triangles (polygons or other 3-D geometry primitive types) that may appear in a display for pixel contribution. The cumulative representation for each pixel is developed in the frame buffer 16 based on all the candidate triangles treated. Generally, the triangles are drawn from the geometric data disk 10, preliminarily processed by the geometric processor 12 in three dimensional model space and presented to the rendering processor 14. Dominant surfaces of the triangles are then scan converted in 2-D screen space by the rendering processor 14 to load the frame buffer 16. In the process, using techniques of the art as well known, the texture map M (FIG. 2) is applied indicating the land masses L. Accordingly, the frame buffer 16 drives the display unit 20 to present an image of the globe G without the dot SL.

As suggested above, various devices exist for applying color to the globe G as the dot SL. Specifically, such device is designated a texture data source 22, and for example may comprising a brush as disclosed in a pending U.S. patent application entitled "Real-Time Image Generation System For Simulating Physical Paint, Drawing Media, and Feature Modeling With 3-D Graphics" and identified by the U.S. Ser. No. 08/195,112.

Pursuing the above example, the texture data source 22 may be employed to apply the blue dot SL operating through the processor 14 to the frame buffer 16. The applied color (blue dot SL) is stored separately in a hidden screen storage 24. Specifically, the applied raw color is indicated in the hidden screen storage 24 for specific pixels of the frame buffer array carrying the dot SL. Note that "hidden" screen storage is not necessary if the data is otherwise available.

Figure 3:
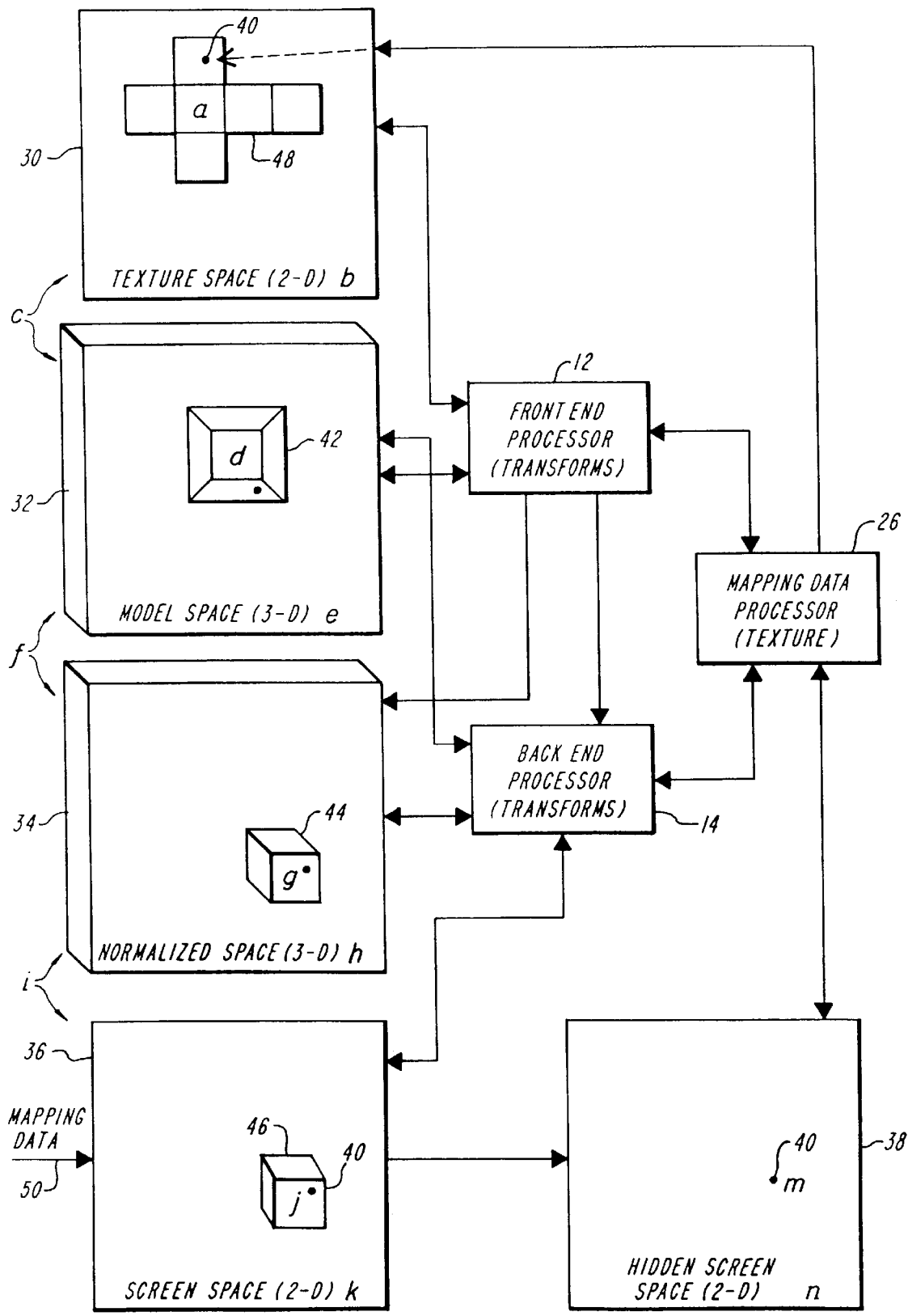
FIG. 3 is a block diagram showing an alternate format of the system of FIG. 1, illustrating memory and processing structures in greater detail.

With the dot SL stored in the hidden storage 24, reflected in the frame buffer 16 and displayed on the globe G, the system proceeds to blend the dot SL into the texture map M (FIG. 2). The operation is initially described somewhat generally, then in detail with reference to the various space coordinates that are involved (FIG. 3). Initially, the operation involves polygon or other primitive processing.

Polygons from the disk 10 are treated in sequence. That is, all polygons involved in the image of the globe G are tested for relevance to the dot SL. Specifically, polygons are tested, as for a front-facing presence in the image of the globe G. Relevant polygons are then transformed from 3D model space to 2D screen space and tested for proximity to the dot SL. Polygons in the region of the dot SL (identified by vertices) are transformed into texture space (texture memory 18) to identify texels relevant to the dot SL. The relevant texels are then scan converted, the content of appropriate texels being blended with the color data of the blue dot SL. The blended data is then stored in the texture map M (FIG. 2) providing an effective and variously usable addition to the texture.

As described in detail below, the operations are cooperatively performed between the memory units (10, 16, 18 and 24) by the processors (12, 14 and 26). To pursue the structure and process operations in greater detail, reference will now be made to FIG. 3 showing the processors in relation to the spaces of the memory units.

In FIG. 3, cubes and blocks represent the memory for the different space coordinates. Specifically, a texture memory block 30 provides 2-D space for the texture maps. A model space memory cube 32 provides 3-D memory for geometric data. A normalized space memory cube 34 provides 3-D space for normalized geometric data, and a screen space memory block 36 (frame buffer) provides 2-D storage for display or screen data. Additionally, a hidden screen memory block 38 provides two dimensional storage for the applied color. This method also works with 3-D texture spaces.

As an aid to understanding, each of the memories of FIG. 3, their contents and the processing operations are alphabetically designated. For example, the memory block 30 contains texel data a (texture map) in 2-D texture space b. The memory cube 32 contains 3-D geometric data d in 3-D model space e. The memory cube 34 contains transformed model data g contained in 3-D normalized space h. The memory block 36 contains display data j in 2-D screen space k. Data also is supplied to the block m stored as color data n.

The movement of data from one memory to another involves transformations as generally described above. For example, the transformation mapping between 2-D texture space b and 3-D model space e may be either implicit or explicit and may or may not be globally invertible. However, the data is invertible on a case by case basis.

The processes, including transformations, also are alphabetized. Specifically, the front end processor 12 performs transformations c between the texture map block 30 and the model space cube 32. Transformations between the model space cube 32 and the normalized cube 34 are designated f. The transformations i are between the normalized space cube 34 and the screen space block 36. As explained in detail below, all such operations are controlled by the map data processor 26 which also executes the scan conversion operations. Note that in various implementations, the different operations may be variously allocated. Essentially, individual operations, as various transformations and scan converting, are well known, as are structures for executing them. It is the arrangement to execute the process hereof that accomplishes the desired result.

In the disclosed process first, briefly consider the development of a display. Representations of polygons (not shown) which in turn define a geometric box 42 (FIG. 3) are transformed to a normalized version represented as a normalized box 44 by data g in space h. From normalized space h, the box representation 44 is transformed to a box representation 46 (data j in space k). Again, note that the box representations are as polygons (triangles—not shown) which actually constitute the transformed data.

The transformations of data from one memory to another involve matrix operations as well known in the prior art. Specifically in that regard, see Chapter 18 and the Appendix of the above-referenced Foley textbook. Such transformation operations are accomplished by the processors 12 and 14 in a forward direction and those processors in combination with the mapping data processor 26 in the reverse direction. Recapitulating, though not necessary, in some instances, data is available, being dissected to sequences of triangles. The data d defining the box 42 is normalized to provide data g manifesting the cube 44, generally by the front end processor 12. The normalized box 44 is then textured and scan converted to display data manifesting the cube 46 as represented by the data j in space k. Thus, the cube 46 is displayed using data from the geometric box 42 and the map 48.

Assume now that blue paint, defining a dot 40 is applied to the box 46 through the input 50 utilizing a textured data source as described with respect to FIG. 1. Essentially, the dot 40 is displayed on the cube 46 and the color data is stored in screen space k as in a frame buffer. The color (or other desired data) also is stored in hidden screen space n as data m.

With an image (box 46) displayed, and color or paint (dot 40) applied for example, the system now functions to accomplish the dot 40 in the texture map as carried in the texture memory 30 (FIG. 3). From that location, the data of the dot 40 can be selectively applied to various representations of the cube 46 along with any other texture.

Figure 4:
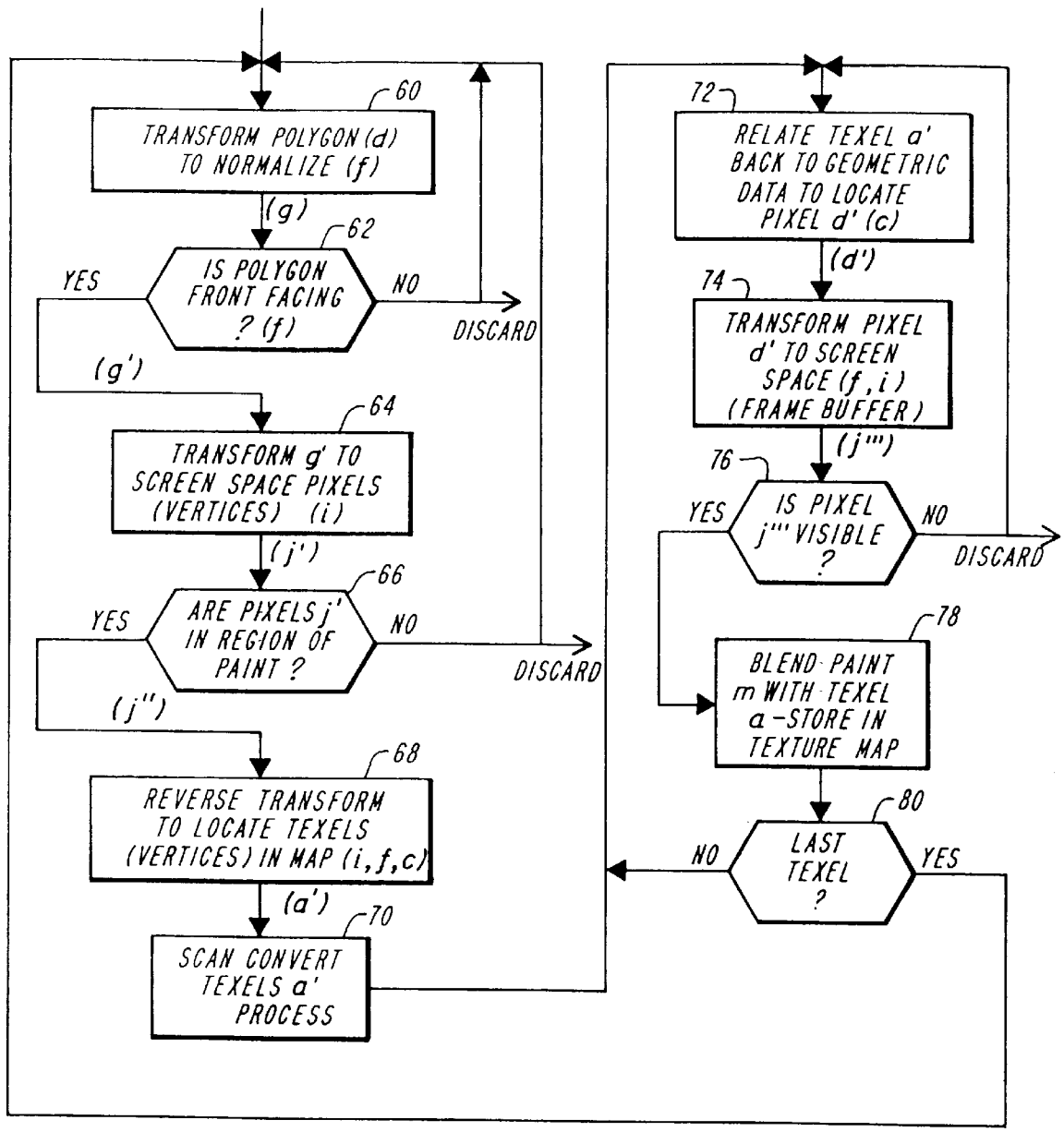
FIG. 4 is a flow diagram illustrating an operating process for the system of FIGS. 1 and 3.

The operations for accomplishing the dot 40 in texture b (texture memory 30) can be summarized to some extent. Specifically, an initial operation involves locating the polygon(s) in model space e that contains the dot. The locating operation may be performed by transforming polygons in sequence from model space to screen space for testing. With the identification of a select polygon (or polygons), the texels within the polygon are located and scan converted for coincidence with the pixels constituting the dot 40. The operation will now be treated in detail referring somewhat concurrently to FIGS. 3 and 4. In that regard, FIG. 4 illustrates the logic operations executed by the cooperative operation of the front end processor 12 (FIG. 3), the back end processor 14 and the mapping data processor 26.

The operation of selecting or identifying the relevant polygons (for the dot 40) involves testing the polygons as stored in model space e. Accordingly, as indicated by the block 60 (FIG. 4), each polygon is initially transformed from the data d to data g by the function f (processor 12) preparatory to a query operation as represented by the block 62. The query operation f determines whether or not the polygon under consideration is "front facing." Essentially, if the polygon is not "front facing" it will not appear in the display and may be discarded. Alternatively, if the polygon is "front facing" it must be given further consideration and the operation proceeds as data g' to the block 64 executed as operation i.

As represented by the block 64, data g' (indicative of a front facing polygon) is transformed to pixel representations (data j and stored in screen space k) (FIG. 3). Note that the transformation is of the polygon vertices, so as to define the area of the polygon in screen space as indicated by the block 64. The data j, representative of the polygon, is provided in the form j' for a query as represented by the block 66 (FIG. 4). Specifically, the query determines the proximity of pixels (data j') to the dot 40, specifically the applied new data, e.g. paint. If the pixels are not in the area or region of the paint, the polygon can be discarded with the process returning to consider the next polygon. Alternatively, if the region of paint is designated, the polygon receives further processing. Specifically, data j" is processed by reverse transform to identify specific pixels in the texture map as indicated by the block 68. In accordance with FIGS. 3 and 4, the operation of the block 68 involves reverse transforms through the processes i, f, and c, to identify the specific texels in a designated polygon for consideration to carry the applied paint. The next operation generally involves scan converting the polygon data a', as indicated by the block 70. The scan conversion involves treatment of individual texels (designated a' in relation to a polygon) to receive color. Accordingly, individual texels are processed in sequence by the steps illustrated in FIG. 4 under the block 70. Texels are treated in sequence until all have been considered after which the process returns to treat a fresh polygon (block 60).

Considering the steps of the texel scan conversion, data a' (indicating a texel) is related back to geometric data by the operation c as indicated by the block 72. The operation is performed by the processor 12 as illustrated in FIG. 3. Essentially, the texel is translated to indicate pixel data d' in model space e. Note that this "pixel data" may actually be multiple pixels, or fractions of pixels, depending on all the aforementioned transformations. A further transform is then performed as indicated by the block 74. Specifically, the data of the pixel d' is transformed to screen space indicating pixel data j'". In screen space k, the pixel data j'" is tested for visibility as indicated by the query block 76. If the pixel data is not visible, it is discarded. Alternatively, a pixel data is identified to specify that its equivalent texel shall receive the paint. Specifically, the existing texel, which may or may not have content, is blended with the data m indicating the paint in hidden screen space n. The operation is represented in FIG. 4 by the block 78. As a result, the substance of the paint (added characteristic) is added to the texture map for subsequent and distinct texture mapping operations. With the completion of that operation, the process proceeds to a final query block 80 for determination of whether or not the texel was the last in the polygon. If so, the processing of the polygon is complete and the process returns to the step represented by the block 60. Alternatively, additional texels of the polygon must be processed in the scan conversion operation with the result that the process returns to the block 72 for the treatment of the next texel.

Figure 5:
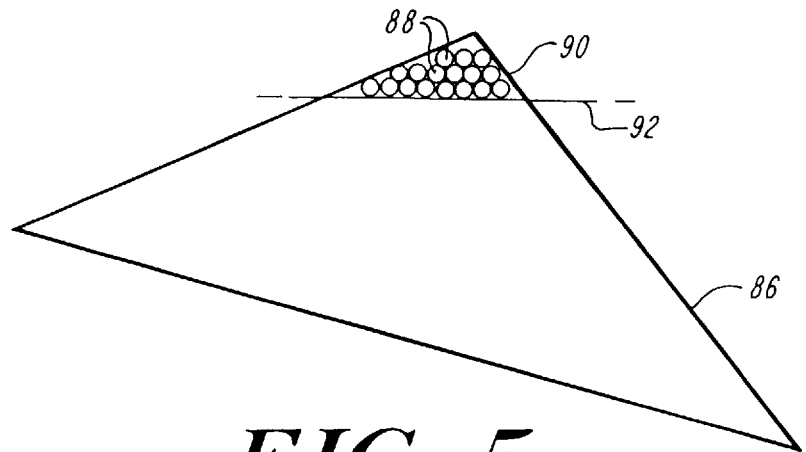
FIG. 5 is a diagram illustrating an operation of the system of FIGS. 1 and 3.

Recapitulating to some extent, scan conversion operations are described in the above referenced Foley textbook and in that regard, rasterizing operations with respect to a polygon are illustrated at page 884. Essentially, with the identification of a polygon 86 (FIG. 5), scan processing may involve the sequential treatment of discrete pixel areas 88 for consideration. For example, assume that only the apex 90 of the polygon 86 is visible in a display. For example, the lower portion of the polygon 86 may be obstructed by another polygon 92 as partially indicated. In that event, the texels equivalent to the illustrated pixel areas 88 are identified to receive the applied paint. As indicated above, the pixel areas 88 are treated in sequence during the scan conversion process with resulting determination of blending operations. Specifically, obstruction comparisons are done by preserving the depth buffer ("z-buffer") from the 3D-rendering process.

Figure 6:
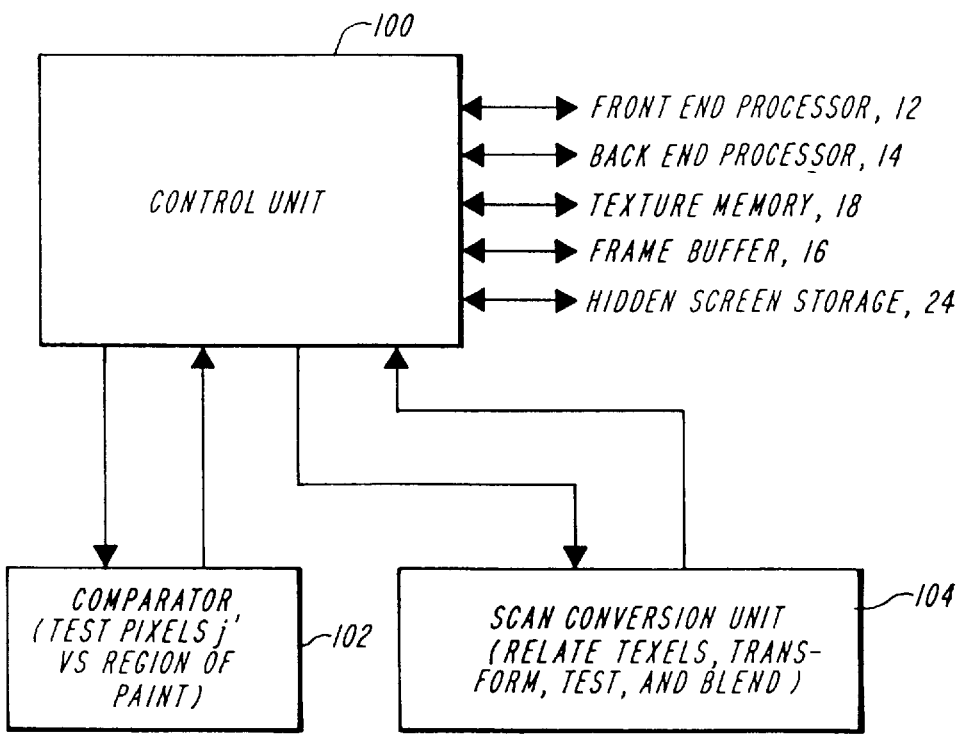
FIG. 6 is a block diagram of a component part of the system as illustrated in FIG. 3.

In the execution of the process as explained above, as suggested cooperative processing is accomplished by the processors 12 and 14 along with the mapping data processor 26. The operations of the front end processor 12 and the back end processor 14 are well known; however the functions of the mapping data processor 26 merits some further consideration. In that regard, it is to be noted that any of a wide variety of implementations may be utilized to execute the processes hereof; however, as detailed for purposes of explanation and illustration, the processor 26 may take the form as illustrated in FIG. 6.

A control unit 100 (FIG. 6) controls the operations detailed above in the context of a data processing system (FIG. 1). In that regard, as indicated, the control unit 100 is connected to the front end processor 12, the rendering or back end processor 14, the texture memory 18, the frame buffer 16 and the hidden screen storage 24. Additionally, the control unit includes bi-directional connections to a comparator 102 and a scan conversion unit 104. Again, note that these functions may be performed by components of existing processor structure; however, as disclosed herein, the control unit 100 controls the comparator 102 to execute the test illustrated by the query block 66 in FIG. 4. Somewhat similarly, the scan conversion unit 104 executes the scan conversion process detailed under the block 70 and including the process steps of blocks 72, 74, 76, 78 and 80. Thus, an integrated system is accomplished to execute the illustrative process as described in detail above.

Accordingly, in association with a computer graphics system, model data may be employed to develop graphic images that are mapped by texture maps and further, in accordance herewith, paint or other forms of fresh map data may be applied to an image for blending into the texture map. Specifically, the operations involve testing the model data in relation to the fresh map data or paint to identify specific model data which is then transformed and tested to identify a specific pixel locations for receiving the paint. Accordingly, an effective and convenient system is provided for accomplishing texture or related forms of data in a map for use in association with graphics images.

In view of the above description, it will be apparent that the system of the present invention may be effectively used in computer graphics system to accomplish effective and economical new supplemental data (supplementing geometric data in a display) for various purposes. Although the disclosed embodiment is directed primarily to a form or system of texture mapping, it will be apparent that the system may be variously embodied to accommodate various other operations of incorporating new data. Furthermore, it will be apparent that while the disclosed embodiment comprises specific elements and configurations, any of a variety of structures or process variations might well be utilized. Accordingly, the scope hereof is deemed to be as set forth in the claims as set forth below.

What is claimed is:

1. A method for updating texture maps on a computer system corresponding to a textured, three-dimensional object, the method comprising the steps of:

providing a first set of texture naps corresponding to said textures, three-dimensional object;

selecting a first orientation of said textured, three-dimensional object;

displaying in a first perspective view in a computer display said oriented, three-dimensional object;

applying supplemental data to said first perspective view of said oriented, three-dimensional object on said computer display;

merging said first set of corresponding texture maps for said three-dimensional object with said supplemental data to provide an second set of corresponding texture maps for said three-dimensional object.

2. The method of claim 1 further including the steps of:

selecting a second orientation of said textured, three-dimensional object;

displaying in a second perspective view on a computer display said second oriented, three-dimensional object including said supplemental data responsive to said second perspective view.

3. The method of claim 1 further including the steps of:

providing three-dimensional model data corresponding to said textured, three-dimensional object, said three-dimensional model data having continuous three dimensional;

wherein said displaying in a second perspective view step includes, transforming said three dimensional model data to the space of said second set of texture maps to provide map location data, testing said map location data for image visibility to identify visible map locations in said second perspective view and blending said visible new data at said identified visible map locations of said second perspective view.

4. The method according to claim 3 wherein said three dimensional model data in the form of a polygonal mesh.

5. The method according to claim 3 wherein said transforming step includes transforming three dimensional polygons to two dimensional picture elements (pixels).

6. The method according to claim 1 wherein said applying step includes applying said supplemental data with a brush.

7. The method according to claim 1 wherein said supplemental data is an image.

8. The method according to claim 1 wherein said supplemental data is a bump map.

9. A computer graphic system for updating texture maps on a computer system corresponding to a textured, three-dimensional object and having a first set of texture maps, the method comprising:

means for selecting a first orientation of said textured, three-dimensional object;

means for displaying in a first perspective view on a computer display said oriented, three-dimensional object;

means for applying supplemental data to said first perspective view of said oriented, three-dimensional object on said computer display;

means for merging said first set of corresponding texture maps for said three-dimensional object with said supplemental data to provide an second set of corresponding texture maps for said three-dimensional object.

10. The system of claim 9 further comprising:

means for selecting a second orientation of said textured, three-dimensional object;

means for displaying in a second perspective view on a computer display said second oriented, three-dimensional object including said supplemental data responsive to said second perspective view.

11. The system of claim 9 further comprising:

means for providing three-dimensional model data corresponding to said textured, three-dimensional object, said three-dimensional model data having continuous three dimensions;

wherein said means for display in a second perspective view includes, means for transforming said thee dimensional model data to the space of said second set of texture maps to provide map location data, and means for testing said map location data for image visibility to identify visible map locations in said second perspective view and blending said visible new data at said identified visible map locations of said perspective view.

* * * * *